UNITED STATES PATENT OFFICE.

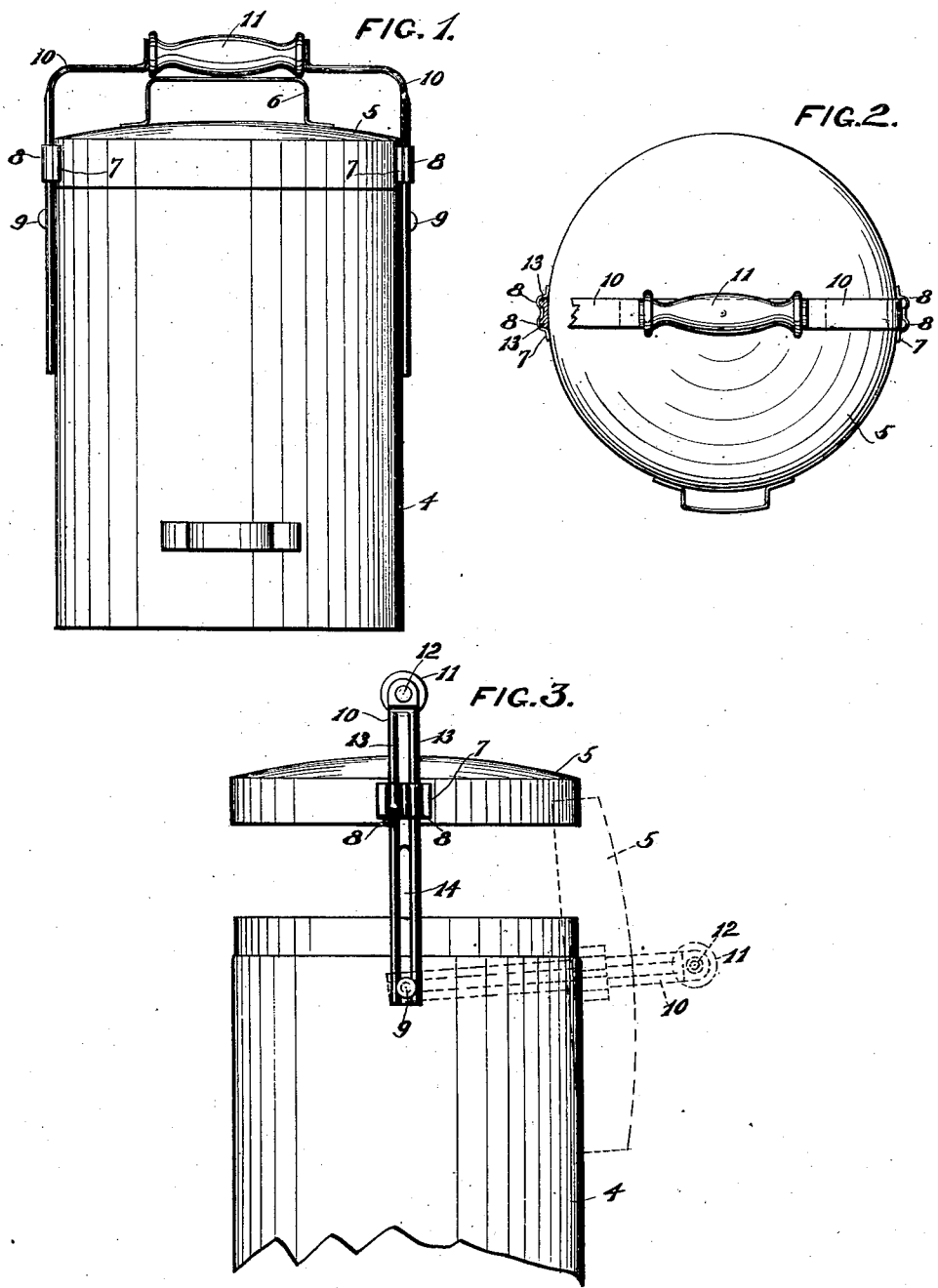

CHARLES THEURER, OF MILWAUKEE, WISCONSIN.

PAIL OR RECEPTACLE.

No. 918,222.  Specification of Letters Patent.  Patented April 13, 1909.

Application filed September 13, 1907. Serial No. 392,638.

*To all whom it may concern:*

Be it known that I, CHARLES THEURER, residing in Milwaukee, in the county of Milwaukee and State of Wisconsin, have invented new and useful Improvements in Pails or Receptacles, of which the following is a description, reference being had to the accompanying drawings, which are a part of this specification.

My invention has relation to improvements in pails or receptacles especially adapted for ashes, garbage, and the like.

One of the objects of the invention is to provide a construction wherein the cover is capable of a sliding movement on the legs of the pivoted bail handle, whereby a person is enabled to lift the cover from engagement with the rim of the pail or receptacle, and then swing the handle on its pivots so as to throw the cover to an open position.

A further object contemplated is the provision not only of a cover slidable on the legs of the pail handle, but also the provision for the pail handle itself being slidable up and down.

A still further object contemplates the feature of the cover being also provided with a handle, whereby a person may grasp both handles at the same time, and thus bring the cover out of engagement with the rim of the pail, and the handle of the cover into engagement with the handle of the pail, so that by then swinging the pail handle on its pivots the cover is thrown to an open position.

With the above primary, and other incidental, objects in view, the invention consists of the devices and parts, or their equivalents, as hereinafter set forth.

In the accompanying drawing, Figure 1 is an elevation of a pail or receptacle embodying my improvements, and showing the slidable handle in its lowest position, and the cover closed; Fig. 2 is a plan view of Fig. 1, part broken away; and Fig. 3 is an elevation of a fragment of the pail showing the handle and cover raised, and also showing in dotted lines the handle and cover swung outwardly so as to bring the cover to an open position.

Referring to the drawing, the numeral 4 indicates an ordinary form of pail or receptacle, especially adapted for ashes, garbage, and the like, and provided with the usual cover 5, said cover having a central handle 6.

Secured to the rim or depending flange of the cover, and at diametrically opposite points thereof, are loops 7, 7, which are each preferably formed, at a desired distance apart laterally, with outwardly curved portions 8, 8 forming guiding recesses.

Projecting from diametrical opposite points of the pail, and near the upper end thereof, are pivots 9, 9.

The handle of the pail consists of the top horizontal portion and the depending legs, constituting the usual bail form of handle, and preferably comprising the two angularly bent members 10, 10 and the central hand portion 11 secured between the upturned ends of the horizontal portions of the angularly bent members by means of a pin 12. The depending legs of the members 10 of the pail handle pass through the loops 7 of the cover, and each of said legs is provided longitudinally with two ribs 13, 13 which fit, and are adapted to slide, in the guide recesses 8 of the cover loops. Each depending leg of the pail handle is also provided with an elongated slot 14, which extends from approximately the center of the leg down to near the lower extremity of said leg. The two pivots 9 of the pail pass through the elongated slots.

Fig. 1 of the drawing shows the cover in its closed position, and when in such position, it will be seen that the handle 6 thereof is close to or in contact with the under side of the hand piece 11 of the pail handle. This enables a person to grasp both handles at the same time, and by exerting an upward pull, not only is the cover drawn upwardly out of engagement with the rim of the pail, but at the same time the leg members of the handle are drawn upwardly, as clearly shown in full lines in Fig. 3. The parts are now in position for readily and conveniently turning the cover to the open dotted line position shown in Fig. 3, and which is accomplished merely by swinging the pail handle outwardly on its pivots, which of course also carries outwardly the cover, so that said cover lies along the side of the pail. In readjusting the cover to a closed position, the reverse operation is necessary, that is to say, the pail handle and with it the cover are swung inwardly to the full line position shown in Fig. 3, and by then grasping both handles and pushing downwardly the cover is brought to its closed position, and at the same time the legs of the pail handle are forced downwardly to their lowest position, so that the parts again assume the positions shown in Fig. 1.

From the foregoing description, it will be seen that I provide a most convenient construction of pail wherein it is impossible for the cover to be removed and become lost, while at the same time the free opening and closing of the cover is not in the least interfered with. The construction furthermore permits the pail to be carried by its handle without in the least interfering with the closed position of the cover of the pail.

While I have shown and described certain details of construction, yet I do not wish to be understood as specifically limiting myself thereto, inasmuch as the broad idea of my invention contemplates the coupling of the cover with the pivoted pail handle, so that said cover may have an up and down sliding movement on the legs of the pail handle, and a consequent capability, when slid upwardly, of being swung with the pail handle to an open position; and in addition thereto, and as an adjunctive feature thereof, the capability of the pail handle also having a sliding movement with respect to and independent of the cover, and still further, and as an adjunctive feature to the latter construction, the provision also of a handle for the cover. The invention furthermore includes within its scope, the feature of a pail handle having its legs turnable and vertically slidable on pivots extending from the pail.

What I claim as my invention is:

1. The combination of a pail or receptacle, a handle provided with depending legs, said legs being pivoted to the pail or receptacle and provided longitudinally with ribs, and a cover provided with loops through which the legs of the pail handle extend, said loops having recesses to receive freely therein the ribs of the legs, whereby the cover is adapted to have an up and down sliding movement on said legs.

2. The combination of a pail provided with pivots, a handle for the pail provided with depending legs, each depending leg of said handle being provided longitudinally with ribs, and with an elongated slot, the pivots of the pail passing through said slots, and a cover provided with loops through which the legs of the pail handle extend, said loops having recesses to receive freely therein the ribs of the legs, whereby the cover is adapted to have an up and down sliding movement on said legs.

In testimony whereof, I affix my signature, in presence of two witnesses.

CHARLES THEURER.

Witnesses:
ANNA F. SCHMIDTBAUER,
A. L. MORSELL.